(12) United States Patent
Caraccioli

(10) Patent No.: US 10,599,490 B1
(45) Date of Patent: Mar. 24, 2020

(54) NOTIFICATION RELAY SYSTEM FOR SUPERVISORY AND SUBORDINATE USER COMPUTING DEVICES

(71) Applicant: Bank of America Corporation, Charlotte, NC (US)

(72) Inventor: Angela L. Caraccioli, Chandler, AZ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/438,624

(22) Filed: Jun. 12, 2019

(51) Int. Cl.
  *G06F 9/54* (2006.01)
  *G06F 3/0482* (2013.01)
  *G06N 20/00* (2019.01)
  *G06K 9/62* (2006.01)

(52) U.S. Cl.
  CPC ............ *G06F 9/542* (2013.01); *G06F 3/0482* (2013.01); *G06F 9/546* (2013.01); *G06K 9/6263* (2013.01); *G06N 20/00* (2019.01)

(58) Field of Classification Search
  None
  See application file for complete search history.

(56) References Cited

U.S. PATENT DOCUMENTS

| 8,630,949 | B2 | 1/2014 | McLaughlin et al. |
| 2004/0194116 | A1* | 9/2004 | McKee ............ G06F 9/542 719/318 |
| 2015/0088709 | A1 | 3/2015 | Mekala et al. |

* cited by examiner

*Primary Examiner* — Craig C Dorais
(74) *Attorney, Agent, or Firm* — Banner & Witcoff, Ltd.; Michael A. Springs

(57) ABSTRACT

A computing platform having at least one processor, a memory, and a communication interface may establish, via the communication interface, respective connections to a subordinate user computing device and a supervisory user computing device. The computing platform may receive information defining a first event associated with the subordinate user computing device and compare the information to supervisory criteria. The computing platform may transmit to the supervisory user computing device a first formatted alert for display thereon. The computing platform may receive supervisory user input and generate a second formatted alert reflecting the supervisory user input. The computing platform may transmit the second formatted alert to the subordinate user computing device for display thereon.

20 Claims, 6 Drawing Sheets

US 10,599,490 B1

NOTIFICATION RELAY SYSTEM FOR SUPERVISORY AND SUBORDINATE USER COMPUTING DEVICES

BACKGROUND

Aspects of the disclosure relate to electrical computers, data processing systems, and machine learning. In particular, one or more aspects of the disclosure relate to implementing and using a platform that selectively relays notifications from a subordinate user computing device to a supervisory user computing device and processes supervisory user input to optimize event delivery.

SUMMARY

Aspects of the disclosure provide effective, efficient, scalable, and convenient technical solutions that address and overcome the technical problems associated with optimizing, maintaining, and utilizing computer systems and services. In particular, one or more aspects of the disclosure provide techniques for enabling interactive and customizable controls for a supervisory user with respect to a subordinate user's interactions with a computing platform.

In accordance with one or more embodiments, a computing platform having at least one processor, a memory, and a communication interface may establish, via the communication interface, a first connection to a subordinate user computing device. While the first connection is established, the computing platform may receive, via the communication interface, information defining a first event associated with the subordinate user computing device. The computing platform may compare the information defining the first event to supervisory criteria, establish a second connection to a supervisory user computing device, and transmit to the supervisory user computing device a first formatted alert which, when processed by the supervisory user computing device causes a first notification to be displayed on the supervisory user computing device. The computing platform may receive supervisory user input from the supervisory user computing device and generate a second formatted alert reflecting the supervisory user input. The computing platform may transmit to the subordinate user computing device, the second formatted alert which, when executed by the subordinate user computing device, causes a second notification to be displayed on the subordinate user computing device.

In some examples, the computing platform may execute an algorithm for comparing the information defining the first event, the supervisory information, and the supervisory user input. The second formatted alert may reflect the results of the algorithm.

In other examples, the computing platform may establish, via the communication interface, a third connection to a social media computing device. While the third connection is established, the computing platform may receive, via the communication interface, from the social media computing device, subordinate user segment trends associated with the first event. The algorithm, when executed, may compare the information defining the first event, the supervisory information, the supervisory user input, and the subordinate user segment trends.

In other examples, the computing platform may, responsive to receiving the information defining the first event, based on a machine learning dataset, modify the algorithm for comparing the information defining the first event, the supervisory information, and the supervisory user input. In some examples, the algorithm may be modified based on historical information received from the subordinate user computing device. In other examples, the algorithm may be modified based on information received from a plurality of subordinate user computing devices.

In yet other examples, the computing platform may be configured to modify account setting(s) associated with the subordinate user computing device. In a case where account settings are modified, the second notification may include information associated with the modified account setting(s).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

There is an omnipresent need for educating young adults and adolescents approaching adulthood with respect to the management of funds. Aspects of the disclosure relate to systems for interactively monitoring spending of such individuals, such as a dependent child or other person ("subordinate user") under the care of a parent or guardian ("supervisory user"). A system may monitor the purchasing activities of a subordinate user and transmit notifications to a supervisory user, e.g., in the event that the subordinate user attempts an irregular transaction, such as exceeding a spending limit or falling outside of predefined product/service categories. The system also may facilitate direct and real-time communication between supervisory- and subordinate users, and assist in educating subordinate users with respect to budgeting and managing funds. In some examples, the system may selectively relay notifications meeting certain criteria, e.g., fraud alerts, low balance alerts, or the like, from a subordinate user's account to an associated supervisory user device.

Figure 1A:
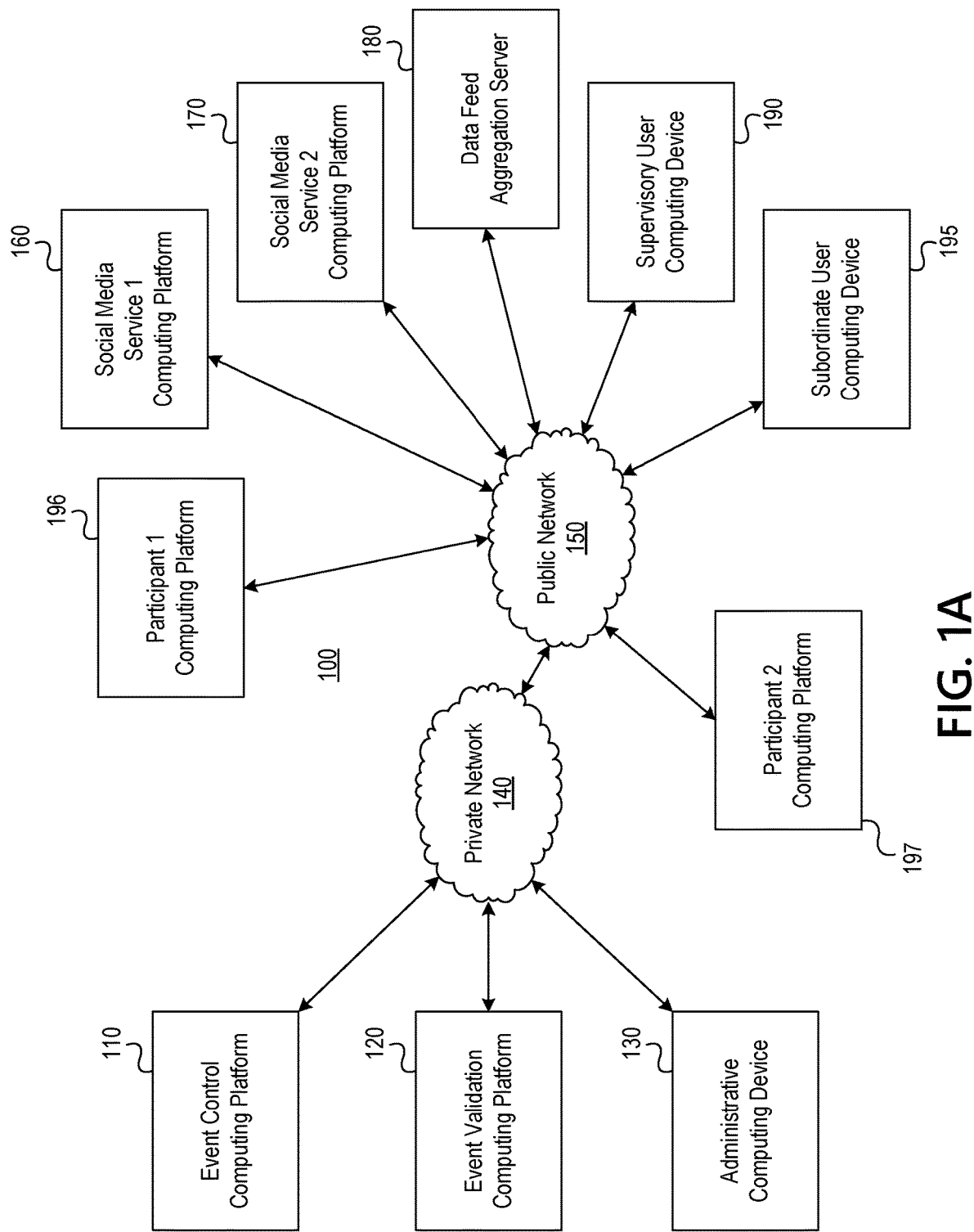
FIGS. 1A and 1B depict an illustrative computing environment for validating and controlling events executed across multiple computing platforms and devices in accordance with one or more example embodiments.
Figure 1B:
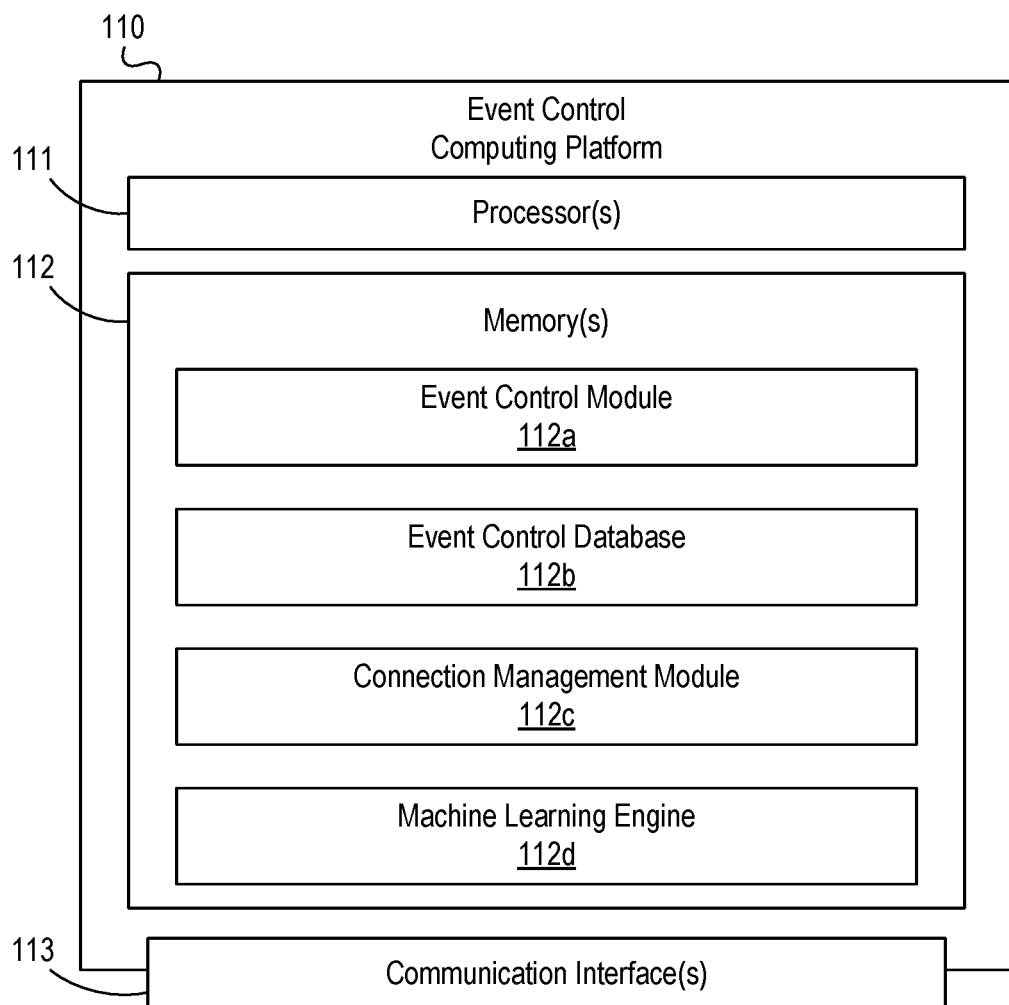

FIGS. 1A and 1B depict an illustrative computing environment for validating and controlling events executed across multiple computing platforms and devices in accordance with one or more example embodiments. Referring to FIG. 1A, computing environment 100 may include one or more computer systems, one or more computer networks, and/or other computing infrastructure. For example, computing environment 100 may include an event control computing platform 110, an event validation computing platform 120, an administrative computing device 130, a private network 140, a public network 150, a first social media service computing platform 160, a second social media service computing platform 170, a data feed aggregation server 180, a supervisory user computing device 190, a subordinate user computing device 195, a first participant computing platform 196, and a second participant computing platform 197.

As discussed in greater detail below, event control computing platform 110 may include one or more computing devices configured to perform one or more of the functions described herein. For example, event control computing platform 110 may include one or more computers (e.g., laptop computers, desktop computers, servers, server blades, or the like) that are configured to orchestrate event validation operations and event control operations across multiple computer systems and devices in computing environment 100.

Event validation computing platform 120 may include one or more computing devices configured to validate events based on event data received from event control computing platform 110 and/or from other sources. For example, event validation computing platform 120 may receive, from event control computing platform 110 and/or one or more other systems, event information defining one or more events to be executed in computing environment 100, and event validation computing platform 120 subsequently may authorize and/or otherwise validate the one or more events to be executed in computing environment 100, so as to allow the events to proceed and/or otherwise be executed. In some instances, the one or more events may correspond to one or more financial transactions that have been requested by one or more computing devices, such as supervisory user computing device 190 and/or subordinate user computing device 195, and event validation computing platform 120 may evaluate and/or selectively authorize the requested transactions based on information stored and/or maintained by event validation computing platform 120 (e.g., such as financial account information, account balance information, transaction history information, and/or account rules) and/or based on information received from event control computing platform 110 (e.g., such as user-specific transaction rules, account-specific transaction rules, user-specific trends information, user-segment trends information, and/or other information) and/or one or more other systems.

Administrative computing device 130 may be a desktop computer, laptop computer, workstation, or other computing device that is configured to be used by an administrative user, such as a network administrator associated with an organization operating event control computing platform 110 and/or event validation computing platform 120.

Social media service computing platform 160 may include one or more computing devices configured to host a first social media service (which may, e.g., be provided by an organization different from the organization operating event control computing platform 110 and/or event validation computing platform 120). In some instances, social media service computing platform 160 may maintain user profile information for various users of the first social media service, provide user interfaces associated with the first social media service to various user devices (e.g., supervisory user computing device 190 and/or subordinate user computing device 195), and provide activity feed data to other systems and/or devices included in computing environment 100, such as event control computing platform 110, event validation computing platform 120, data feed aggregation server 180, and/or the like. For instance, social media service computing platform 160 may, in some arrangements, provide activity feed data (e.g., user-specific image data, user-specific geolocation data, user-specific likes data, and/or other user-specific data) to event control computing platform 110 to enable one or more functions provided by event control computing platform 110 (e.g., social-media-enabled financial-transaction functions).

Social media service computing platform 170 may include one or more computing devices configured to host a second social media service (which may be, e.g., provided by an organization different from the organization operating event control computing platform 110 and/or event validation computing platform 120). Additionally, the second social media service may be different from the first social media service (e.g., the second social media service may be provided by an organization different from the organization providing the first social media service). In some instances, social media service computing platform 170 may maintain user profile information for various users of the second social media service, provide user interfaces associated with the second social media service to various user devices (e.g., supervisory user computing device 190 and/or subordinate user computing device 195), and provide activity feed data to other systems and/or devices included in computing environment 100, such as event control computing platform 110, event validation computing platform 120, data feed aggregation server 180, and/or the like. For instance, social media service computing platform 170 may, in some arrangements, provide activity feed data (e.g., user-specific image data, user-specific geolocation data, user-specific likes data, and/or other user-specific data) to event control computing platform 110 to enable one or more functions provided by event control computing platform 110 (e.g., social-media-enabled financial-transaction functions).

Data feed aggregation server 180 may include one or more computing devices configured to aggregate data feeds from various source systems (e.g., social media service computing platform 160, social media service computing platform 170, and/or other sources) and/or communicate data feeds to various destination systems (e.g., event control computing platform 110). In some instances, data feed aggregation server 180 may receive social media activity feed data from various social media platforms (e.g., social media service computing platform 160, social media service computing platform 170), merchant offer data from various merchant platforms (e.g., defining one or more merchant-specific offers that may be redeemable by customers at such merchants), and/or other activity data and/or content from other sources, and data feed aggregation server 180 may aggregate any and/or all of the received data to produce an aggregated data feed. Subsequently, data feed aggregation server 180 may communicate and/or otherwise provide the aggregated data feed to one or more destination systems, such as event control computing platform 110, so as to enable one or more functions provided by event control computing platform 110 (e.g., social-media-enabled financial-transaction functions). In some instances, the aggregated data feed may be communicated by data feed aggregation server 180 to event control computing platform 110 via a secure and/or encrypted communications link established between event control computing platform 110 and data feed aggregation server 180. FIG. 1A illustrates two merchant platforms as a first participant computing platform 196 and a second participant computing platform 197. In some instances, a larger number of participant computing platforms may be included.

Supervisory user computing device 190 may be a desktop computer, laptop computer, workstation, smartphone, tablet, or other computing device that is configured to be used by a supervisory user. Subordinate user computing device 195 may be a desktop computer, laptop computer, workstation, smartphone, tablet, or other computing device that is configured to be used by a subordinate user. In some arrangements, the supervisory user may be a parent and the subordinate user may be a teen or other minor supervised by the parent. For instance, the user of supervisory user computing device 190 may utilize supervisory user computing device 190 to define one or more rules (e.g., such as spending limits, transaction approval conditions, and/or the like) for the user of subordinate user computing device 195. In addition, as the user of subordinate user computing device 195 utilizes subordinate user computing device 195 and/or one or more other systems and/or devices to request transactions, event control computing platform 110 and/or event validation computing platform 120 may selectively authorize such transactions based on rules received from supervisory user computing device 190 and/or defined by the user of supervisory user computing device 190 and/or based on other factors and/or rules.

Computing environment 100 also may include one or more networks, which may interconnect one or more of event control computing platform 110, event validation computing platform 120, administrative computing device 130, social media service computing platform 160, social media service computing platform 170, data feed aggregation server 180, supervisory user computing device 190, and subordinate user computing device 195. For example, computing environment 100 may include private network 140, which may be owned and/or operated by a specific organization and/or which may interconnect one or more systems and/or other devices associated with the specific organization. For example, event control computing platform 110, event validation computing platform 120, and administrative computing device 130 may be owned and/or operated by a specific organization, such as a financial institution, and private network 140 may interconnect event control computing platform 110, event validation computing platform 120, administrative computing device 130, and one or more other systems and/or devices associated with the organization. Additionally, private network 140 may connect (e.g., via one or more firewalls) to one or more external networks not associated with the organization, such as public network 150. Public network 150 may, for instance, include the internet and may connect various systems and/or devices not associated with the organization operating private network 140. For example, public network 150 may interconnect social media service computing platform 160, social media service computing platform 170, data feed aggregation server 180, supervisory user computing device 190, subordinate user computing device 195, and/or various other systems and/or devices.

In some arrangements, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may be any type of computing device capable of receiving a user interface, receiving input via the user interface, and communicating the received input to one or more other computing devices. For example, the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be and/or include server computers, desktop computers, laptop computers, tablet computers, smartphones, or the like that may include one or more processors, memories, communication interfaces, storage devices, and/or other components. As noted above, and as illustrated in greater detail below, any and/or all of the computing devices that make up and/or are included in event control computing platform 110, event validation computing platform 120, administrative computing device 130, social media service computing platform 160, social media service computing platform 170, data feed aggregation server 180, supervisory user computing device 190, and subordinate user computing device 195 may, in some instances, be special-purpose computing devices configured to perform specific functions.

Referring to FIG. 1B, event control computing platform 110 may include one or more processor(s) 111, memory(s) 112, and communication interface(s) 113. A data bus may interconnect processor(s) 111, memory(s) 112, and communication interface(s) 113. Communication interface(s) 113 may be one or more network interfaces configured to support communications between event control computing platform 110 and one or more networks (e.g., private network 140, public network 150). For example, event control computing platform 110 may establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113, and event control computing platform 110 may exchange data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Memory(s) 112 may include one or more program modules having instructions that when executed by processor(s) 111 cause event control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of event control computing platform 110 and/or by different computing devices that may form and/or otherwise make up event control computing platform 110.

For example, memory(s) 112b may have, store, and/or include an event control module 112a, an event control database 112b, a connection management module 112c, and a machine learning engine 112d. Event control module 112a may have, store, and/or include instructions that direct and/or cause event control computing platform 110 to orchestrate event validation operations and event control operations across multiple computer systems and devices in computing environment 100 and perform other associated functions, as discussed in greater detail below. Event control database 112b may store information used by event control computing platform 110 in orchestrating event validation operations and event control operations across multiple computer systems and devices in computing environment 100 and in performing other associated functions. Connection management module 112c may have, store, and/or include instructions that direct and/or cause event control computing platform 110 to establish one or more connections and/or communication links to one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 and/or to manage and/or otherwise control the exchanging of data with the one or more other systems and/or devices (e.g., event validation computing platform 120, administrative computing device 130, social media service computing platform 160, social media service computing platform 170, data feed aggregation server 180, supervisory user computing device 190, and subordinate user computing device 195) via communication interface(s) 113 while the one or more connections and/or communication links are established. Machine learning engine 112d may have, store, and/or include instructions that direct and/or cause event control computing platform 110 to dynamically analyze data collected by event control computing platform 110 based on historical data sets and/or present operations and automatically optimize the functions provided by event control computing platform 110 based on analyzing such data.

First participant computing platform 196 and second participant computing platform 197 may be associated directly with merchants such as product manufacturers, wholesalers, or retailers, for example, or alternatively may be various other types of platforms offering goods and/or services (referred to herein collectively as "products"), such as auction or consignment type platforms. In some example embodiments, when a subordinate user adds a product to his or her "wishlist," event control computing platform 110 may transmit a request and thereafter receive pricing and availability information from a plurality of sources, as illustrated in FIG. 1A as first participant computing platform 196 and second participant computing platform 197. The data feed aggregation server 180 may aggregate and sort pricing information, e.g., from lowest to highest. Rules may be established to ignore participants whose pricing is above a maximum value assigned by the subordinate user or supervisory user, or which, for example, is in excess of an average selling price for the market.

Upon receiving information from the subordinate user computing device 195, the supervisory user computing device 190, and/or the first participant computing platform 196, the event control computing platform 110 may execute an algorithm for comparing the information defining the first event, the supervisory criteria, and any user input received from the supervisory computing device 190 and/or the subordinate user computing device 195. The algorithm may include a comparison between the price and/or product category of a transaction attempted by the subordinate user and the supervisory criteria, including any user input received from the supervisory computing device 190. The algorithm also may consider other information, such as information received via data feed aggregation server 180 from social media computing platform(s) 160 and/or 170, administrative computing device 130, and/or from other sources. After executing the algorithm, the event control computing platform 110 may transmit a notification to the subordinate user computing device 195 and/or the supervisory user computing device 190 as an alert to the status of the attempted transaction and/or as an invitation to initiate real-time communication between the subordinate user and the supervisory user, e.g., within respective user interfaces, by short message service (SMS), telephone, or the like.

The event control computing platform 110 or the supervisory user computing device 190 may generate rules that the supervisory user may establish or select from that are aimed at assisting the subordinate user in making purchases and managing assets. The supervisory user computing device 190 may be configured, for example, to provide read-only access to an account stored on the subordinate user computing device 195 or, depending on the level of oversight desired, may allow some degree of control to make changes to the subordinate user's account and/or user interface.

In some aspects, the event control computing platform 110 may leverage machine learning to modify the algorithm used for comparing incoming information for a particular subordinate user. For example, the event control computing platform 110 may receive from the supervisory user computing device 190 and/or the subordinate user computing device 195, information relating to activities of the subordinate user. Upon receiving this information, the machine learning engine 112d may assign a positive event (e.g., +1) when a subordinate user completes an authorized transaction and, for example, a significant positive event (e.g., +5) upon the subordinate user timely satisfying a financial obligation. The machine learning engine 112d may assign a negative event (e.g., −1) when a subordinate user, for example, attempts an unauthorized transaction or fails to make a timely payment on a financial obligation. The severity of the negative event may be increased as the delay in making a payment increases (e.g., −2, −3, and so on). At periodic intervals (e.g., quarterly, semi-annually, or annually), the event control computing platform 110 may execute an algorithm that aggregates the positive and negative events that occurred during the interval. In this example, the event control computing platform 110 may simply calculate the sum of the positive and negative events. The algorithm used for comparing information may be modified according to the information received from the subordinate user. For example, for a subordinate user whose "credit score" falls below a defined value (e.g., −5), the algorithm may be modified such that notifications are more often transmitted to the supervisory user computing device 190 with respect to any subsequent attempted transactions by the subordinate user. Conversely, if a subordinate user acquires a "credit score" exceeding a defined value (e.g., +5), then the criteria may be modified such that notifications are less often transmitted to the supervisory user computing device 190 with respect to subsequent attempted transactions by the subordinate user. In addition to (or instead of) modifying the algorithm used for comparing incoming information, the event control computing platform 110 may transmit a notification to the supervisory user computing device 190 with the results of the calculation, which may be categorized into preset groups based on the result (e.g., excellent, good, marginal, or poor). The event control computing platform 110 may transmit an inquiry asking whether the supervisory user wishes to modify any of the criteria for subsequent purchases requested by the subordinate user, e.g., upward or downward adjustment to purchase limits, minimum amount of savings required for a credit purchase, or the like. If the calculation yields a result below a prescribed marginal level, the event control computing platform 110 may transmit an inquiry to the supervisory user computing device 190 asking whether additional limitations on the subordinate user should be imposed, e.g., disallowing new purchases until an existing obligation(s) is satisfied or until the subordinate user's "credit score" improves.

In other examples, the algorithm used for comparing incoming information may be modified based on information received from a plurality of subordinate user computing devices 195. For example, the event control computing platform 110 may determine, based on information received from a plurality of subordinate user devices 195, that a significant number of subordinate users of the same segment (e.g., college students) are purchasing an educational item that is on the wishlist of a particular subordinate user. Such an event may cause the event control computing platform 110 to modify the criteria used for determining whether to transmit a notification to the supervisory user computing device 190. A notification may inform the supervisory user, for example, that many users of the same segment (e.g., college students) have made similar purchases contemporaneously, as a fact to be considered in deciding whether to approve the requested transaction.

Modification of the algorithm used for comparing incoming information may result not only in changes of the timing of the event control computing platform 110 transmitting a notification to the subordinate user computing device 195 and/or the supervisory user computing device 190, but also other factors such as the frequency of transmitting notifications. For example, the event control computing platform 110 may transmit notifications less frequently to subordinate users who exhibit positive credit attributes and more frequently to subordinate users who exhibit negative credit attributes.

Figure 2:
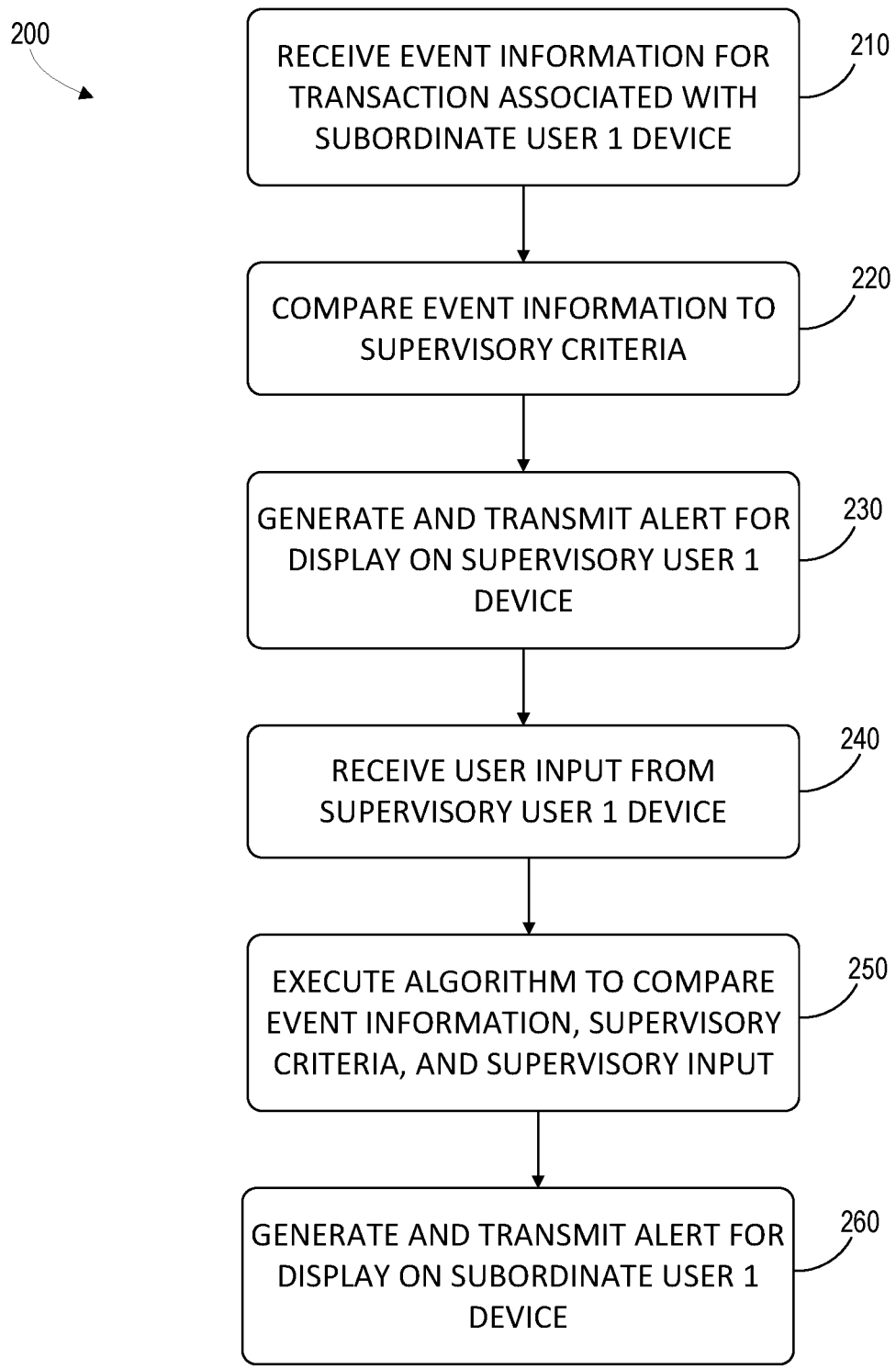
FIG. 2 depicts an illustrative event sequence for executing interactive supervisory controls in a computing environment in accordance with one or more example embodiments.

FIG. 2 illustrates an event sequence 200 in accordance with one or more example embodiments. At step 210, event control computing platform 110 receives event information associated with an attempted transaction on a first subordinate user device 195. The event information may, for example, identify a particular product that the subordinate user attempts to purchase, the purchase price for the product, and/or the product category. At step 220, event control computing platform 110 compares the event information to the supervisory criteria. When the comparison results in a need for supervisory user input, event control computing platform 110 may establish a connection to the supervisory user computing device 190, and, at step 230, generate and transmit an alert for display on the supervisory user computing device 190. The alert may include a user interface for receiving, at step 240, supervisory user input. At step 250, event validation computing platform 120 may execute an algorithm comparing the event information to then-available information, e.g., supervisory criteria, supervisory user input, social media information, and/or subordinate user input, and generates a formatted alert. At step 260, the computing platform may transmit to the subordinate user computing device 195 the formatted alert that causes a notification to be displayed on the subordinate user computing device 195. The notification may indicate such information as whether the attempted transaction has been approved or declined. Examples of graphical user interfaces displayed by subordinate user devices and supervisory user devices are described below with reference to FIGS. 4 and 5.

Figure 3:
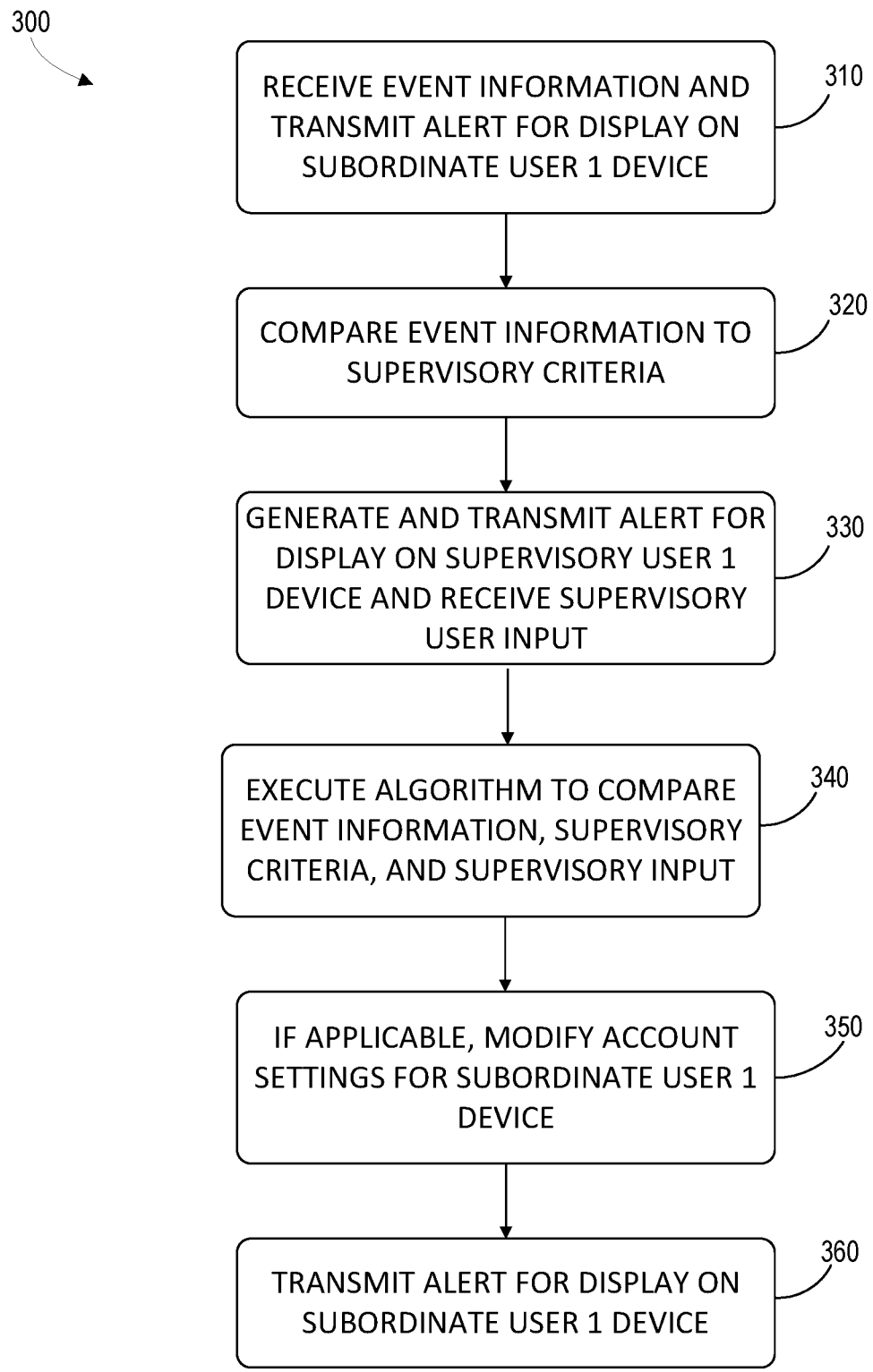
FIG. 3 depicts an illustrative event sequence for relaying notifications to a supervisory user device in accordance with one or more example embodiments.

FIG. 3 illustrates an event sequence 300 in accordance with one or more additional example embodiments. At step 310, event control computing platform 110 receives event information associated with an attempted transaction and transmits an alert for display on the subordinate user device 195. The event information may, for example, identify a particular product that the subordinate user attempts to purchase, the purchase price for the product, and/or the product category. At step 230, event control computing platform 110 may compare the event information to the supervisory criteria. When the comparison results in a need for supervisory user input, event control computing platform 110 may establish a connection to the supervisory user computing device 190, and, at step 330, generate and transmit an alert for display on the supervisory user computing device 190. The alert may include a user interface for receiving supervisory user input. At step 340, event validation computing platform 120 may execute an algorithm comparing the event information to then-available information, e.g., supervisory criteria, supervisory user input, social media information, and/or subordinate user input, and generates a formatted alert. At step 350, event control computing platform 110 may modify the account settings of the subordinate user device 195, e.g., freezing the account. At step 360, the computing platform may transmit to the subordinate user computing device 195 the formatted alert that causes a notification to be displayed on the subordinate user computing device 195. The notification may indicate such information as whether the attempted transaction has been approved or declined, and any changes that may have been made to the account settings.

In accordance with one or more additional embodiments, event control computing platform 110 may collect information from a collection of subordinate user computing devices 195 and their respective supervisory user computing devices 190. Event control computing platform 110 may then execute an algorithm to aggregate this information and periodically transmit reports containing such macro-data, e.g., to administrative computing device 130. The algorithm simply may compile all of the information received, or it may filter information based on preselected criteria. Such information may be used for purposes of machine learning, for example, to modify the supervisory criteria or user interfaces for inputting supervisory criteria.

Other previously described features may be used in connection with the one or more additional embodiments. For example, the administrative computing device 130 may transmit to the event control computing platform 110 business rules or historical information. Social media service computing platform(s) 160 and/or 170 also may transmit to the event control computing platform 110 such additional information as the purchasing behaviors of particular subordinate user segments. The data feed aggregation server 180 and/or machine learning engine 112d may aggregate the various incoming information, and a machine learning dataset optionally may be used to refine the criteria used for aggregating the incoming information.

Figure 4A:
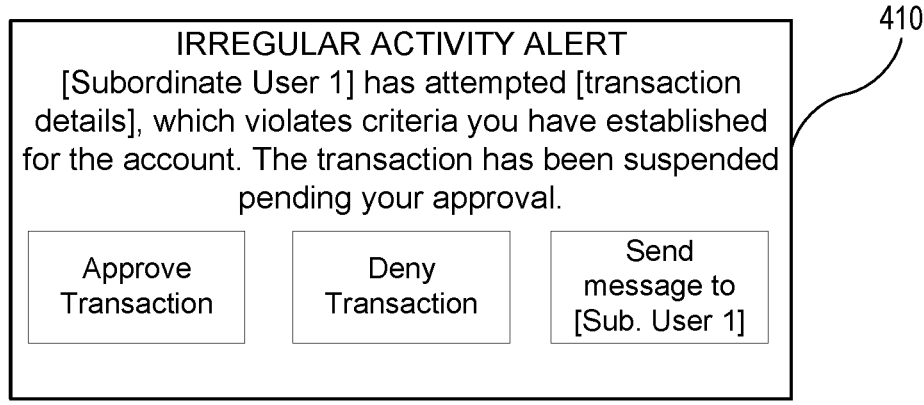
FIGS. 4A-4C depict example graphical user interfaces for subordinate- and supervisory user devices in accordance with one or more example embodiments.
Figure 4B:
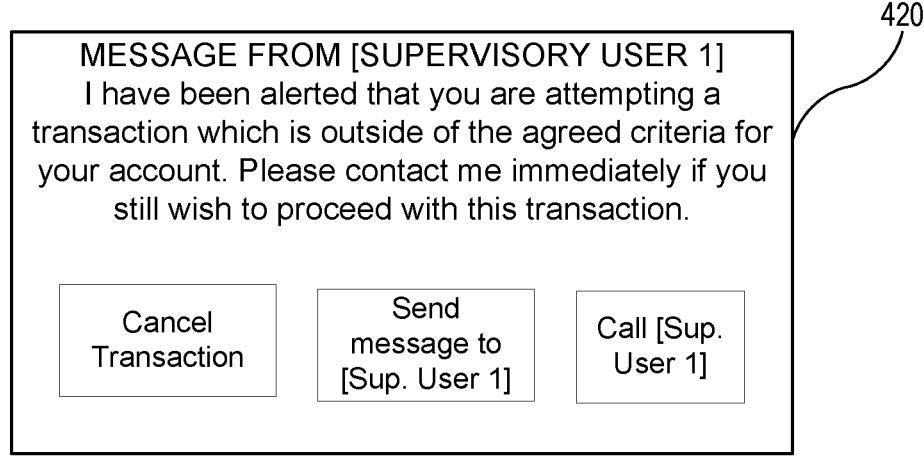
Figure 4C:
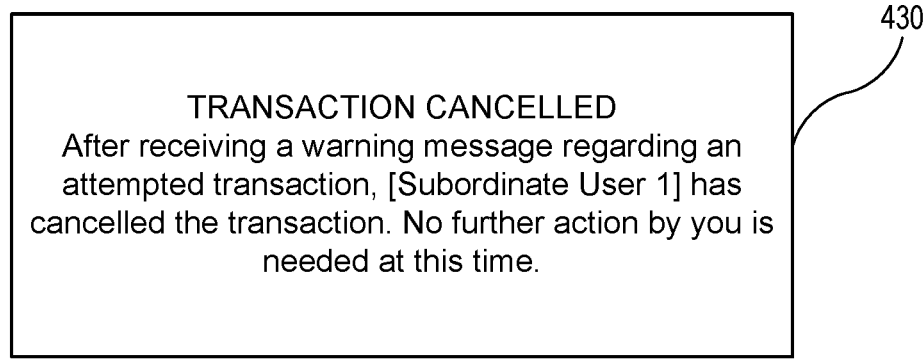

FIG. 4A-4C illustrate examples of graphical user interfaces for facilitating direct communication between a supervisory user device 190 and a subordinate user device 195. FIG. 4A shows a user interface 410 that alerts a supervisory user that a transaction attempted by a subordinate user violates pre-established criteria for the account. The interface 410 may contain at least basic information about the transaction, e.g., price and product name or product category. As shown, the interface 410 may include such options as approving the transaction, denying the transaction, or initiating direct communication with the subordinate user, e.g., by text message or telephone call.

FIG. 4B illustrates an example of a graphical user interface 420 for display on a subordinate user device 195. As shown, the user interface 420 may alert the subordinate user that the attempted transaction violates certain criteria for the account, and may include such options for the subordinate user as cancelling the transaction and sending a message or telephoning the respective supervisory user. FIG. 4C illustrates an example of a user interface 430 that may be used to alert a supervisory user that an attempted transaction has been cancelled by a subordinate user, for example, after receiving a warning message that pre-established criteria were violated.

Figure 5A:
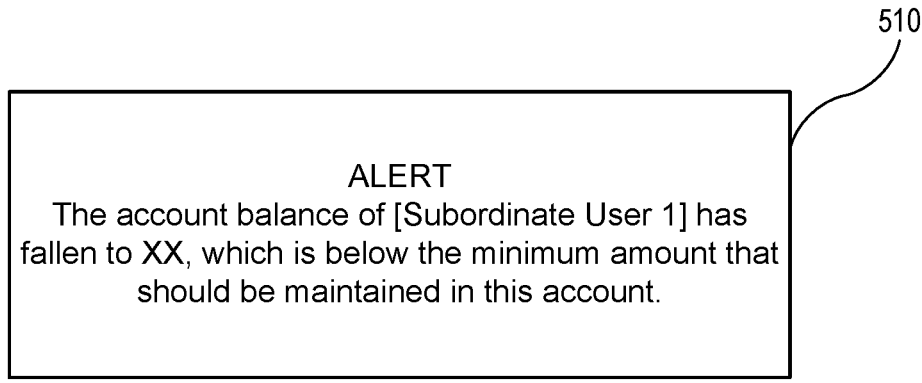
FIGS. 5A-5C depict example graphical user interfaces for subordinate- and supervisory user devices in accordance with one or more additional example embodiments.
Figure 5B:
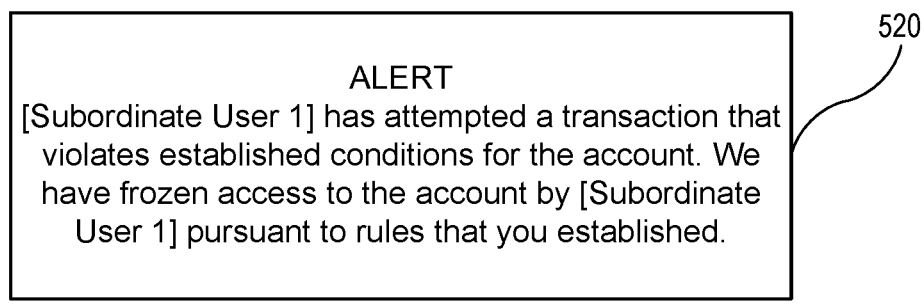
Figure 5C:
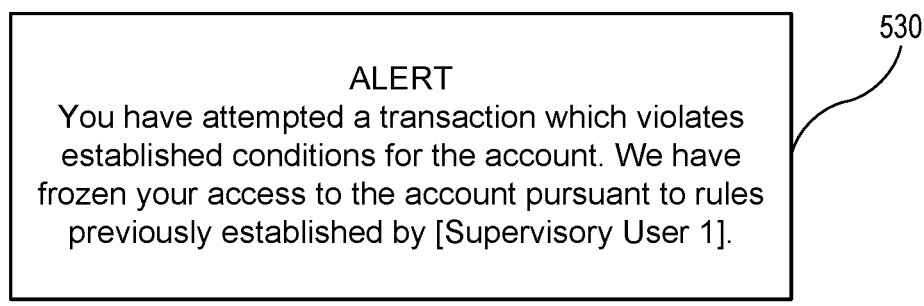

FIG. 5A-5C illustrate additional examples of graphical user interfaces for a supervisory user device 190 or a subordinate user device 195. FIG. 5A shows a user interface 510 that relays a notification meeting certain criteria from the subordinate user device 195 to the supervisory user device 190, such as a low balance warning (as shown), fraud alert, or the like. FIG. 5B shows an example of a user interface 520 that alerts a supervisory user that a subordinate user attempted a transaction that violated criteria such that the subordinate user's account settings were modified, e.g., account frozen. FIG. 5C illustrates an example of a corresponding user interface 530 that alerts the subordinate user as to changes to account settings. Any of the user interfaces shown in FIGS. 5A-5C may also include options for direct communication between the supervisory and subordinate users, e.g., as shown in FIGS. 4A-4C.

The particular user interfaces shown in FIGS. 4-5 are merely illustrative and may be customized depending on user preferences as well as the type of device being used. For example, user interfaces on a smartphone or other telephone-enabled device may include an option to call another entity associated with the computing platform, e.g., subordinate user, supervisory user, and/or participant, instead of or in addition to the option of sending a message to the other entity.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   establish, via the communication interface, a first connection to a subordinate user computing device and while the first connection is established, receive, via the communication interface, information defining a first event associated with the subordinate user computing device;

compare the information defining the first event to supervisory criteria and establish, via the communication interface, a second connection to a supervisory user computing device;

while the second connection is established, transmit, via the communication interface, to the supervisory user computing device, a first formatted alert which, when processed by the supervisory user computing device causes a first notification to be displayed on the supervisory user computing device;

while the second connection is established, receive, via the communication interface, from the supervisory user computing device, supervisory user input; and generate a second formatted alert reflecting the supervisory user input and transmit to the subordinate user computing device, the second formatted alert which, when executed by the subordinate user computing device, causes a second notification to be displayed on the subordinate user computing device.

2. The computing platform of claim 1, wherein the memory stores additional computer-readable instructions that, when executed by the at least one processor, cause the computing platform to:

execute an algorithm for comparing the information defining the first event, the supervisory criteria, and the supervisory user input, wherein the second formatted alert reflects the results of the algorithm.

3. The computing platform of claim 2, wherein the memory stores additional computer-readable instructions that, when executed by the at least one processor, cause the computing platform to:

receive, via the communication interface, subordinate user input;

wherein the algorithm, when executed, compares the information defining the first event, the supervisory criteria, the supervisory user input, and the subordinate user input.

4. The computing platform of claim 2, wherein the memory stores additional computer-readable instructions that, when executed by the at least one processor, cause the computing platform to:

establish, via the communication interface, a third connection to a social media computing device;

while the third connection is established, receive, via the communication interface, from the social media computing device, subordinate user segment trends associated with the first event;

wherein the algorithm, when executed, compares the information defining the first event, the supervisory criteria, the supervisory user input, and the subordinate user segment trends.

5. The computing platform of claim 2, wherein the memory stores additional computer-readable instructions that, when executed by the at least one processor, cause the computing platform to:

responsive to receiving the information defining the first event, based on a machine learning dataset, modify the algorithm for comparing the information defining the first event, the supervisory criteria, and the supervisory user input.

6. The computing platform of claim 5, wherein the algorithm is modified based on historical information received from the subordinate user computing device.

7. The computing platform of claim 5, wherein the algorithm is modified based on information received from a plurality of subordinate user computing devices.

8. The computing platform of claim 1, wherein the memory stores additional computer-readable instructions that, when executed by the at least one processor, cause the computing platform to:

modify one or more account settings associated with the subordinate user computing device;

wherein the second notification includes information associated with the one or more modified account settings.

9. A method, comprising:

at a computing platform comprising at least one processor, memory, and a communication interface:

establishing, via the communication interface, a first connection to a subordinate user computing device and, while the first connection is established, receiving, by the at least one processor, via the communication interface, information defining a first event associated with the subordinate user computing device;

comparing the information defining the first event to supervisory criteria and establishing, via the communication interface, a second connection to a supervisory user computing device;

while the second connection is established, transmitting, via the communication interface, to the supervisory user computing device, a first formatted alert which, when processed by the supervisory user computing device causes a first notification to be displayed on the supervisory user computing device;

while the second connection is established, receiving, via the communication interface, from the supervisory user computing device, supervisory user input; and generating a second formatted alert reflecting the supervisory user input and transmitting to the subordinate user computing device, the second formatted alert which, when executed by the subordinate user computing device, causes a second notification to be displayed on the subordinate user computing device.

10. The method of claim 9, further comprising:

executing an algorithm for comparing the information defining the first event, the supervisory criteria, and the supervisory user input, wherein the second formatted alert reflects the results of the algorithm.

11. The method of claim 9, further comprising:

receiving, via the communication interface, subordinate user input;

wherein the algorithm, when executed, compares the information defining the first event, the supervisory criteria, the supervisory user input, and the subordinate user input.

12. The method of claim 9, further comprising:

establishing, via the communication interface, a third connection to a social media computing device;

while the third connection is established, receiving, via the communication interface, from the social media computing device, subordinate user segment trends associated with the first event;

wherein the algorithm, when executed, compares the information defining the first event, the supervisory criteria, the supervisory user input, and the subordinate user segment trends.

13. The method of claim 9, further comprising:

responsive to receiving the information defining the first event, based on a machine learning dataset, modifying the algorithm for comparing the information defining the first event, the supervisory criteria, and the supervisory user input.

14. The method of claim 13, wherein the algorithm is modified based on historical information received from the subordinate user computing device.

15. The method of claim 13, wherein the algorithm is modified based on information received from a plurality of subordinate user computing devices.

16. The method of claim 9, further comprising:
modifying one or more account settings associated with the subordinate user computing device;
wherein the second notification includes information associated with the one or more modified account settings.

17. One or more non-transitory computer-readable media storing instructions that, when executed by a computing platform comprising at least one processor, memory, and a communication interface, cause the computing platform to:
establish, via the communication interface, a first connection to a subordinate user computing device and while the first connection is established, receive, via the communication interface, information defining a first event associated with the subordinate user computing device;
compare the information defining the first event to supervisory criteria and establish, via the communication interface, a second connection to a supervisory user computing device;
while the second connection is established, transmit, via the communication interface, to the supervisory user computing device, a first formatted alert which, when processed by the supervisory user computing device causes a first notification to be displayed on the supervisory user computing device;
while the second connection is established, receive, via the communication interface, from the supervisory user computing device, supervisory user input; and
generate a second formatted alert reflecting the supervisory user input and transmit to the subordinate user computing device, the second formatted alert which, when executed by the subordinate user computing device, causes a second notification to be displayed on the subordinate user computing device.

18. The non-transitory computer-readable media of claim 17, wherein the computer-readable instructions, when executed by the at least one processor, cause the computing platform to:
execute an algorithm for comparing the information defining the first event, the supervisory criteria, and the supervisory user input, wherein the second formatted alert reflects the results of the algorithm.

19. The non-transitory computer-readable media of claim 18, wherein the computer-readable instructions, when executed by the at least one processor, cause the computing platform to:
establish, via the communication interface, a third connection to a social media computing device;
while the third connection is established, receive, via the communication interface, from the social media computing device, subordinate user segment trends associated with the first event;
wherein the algorithm, when executed, compares the information defining the first event, the supervisory criteria, the supervisory user input, and the subordinate user segment trends.

20. The non-transitory computer-readable media of claim 18, wherein the computer-readable instructions, when executed by the at least one processor, cause the computing platform to:
responsive to receiving the information defining the first event, based on a machine learning dataset, modify the algorithm for comparing the information defining the first event, the supervisory criteria, and the supervisory user input.

* * * * *